(12) United States Patent
Rau et al.

(10) Patent No.: US 7,870,657 B2
(45) Date of Patent: Jan. 18, 2011

(54) MANUFACTURING DEVICE FOR BENDING AN ELECTROMANETIC ELEMENT OF AN ELECTRICAL MACHINE

(75) Inventors: Eberhard Rau, Korntal-Muenchingen (DE); Martin Henne, Moeglingen (DE); Klaus Pflueger, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 597 days.

(21) Appl. No.: 11/576,633

(22) PCT Filed: Nov. 3, 2005

(86) PCT No.: PCT/EP2005/055731

§ 371 (c)(1),
(2), (4) Date: Apr. 4, 2007

(87) PCT Pub. No.: WO2006/061294

PCT Pub. Date: Jun. 15, 2006

(65) Prior Publication Data

US 2007/0277365 A1      Dec. 6, 2007

(30) Foreign Application Priority Data

Dec. 6, 2004   (DE) .................. 10 2004 058 659

(51) Int. Cl.
*H02K 15/00* (2006.01)

(52) U.S. Cl. .............. 29/596; 29/602.1; 29/603.2; 29/603.12; 29/603.16; 29/732

(58) Field of Classification Search ............... 29/596, 29/732, 602.1, 603.04, 603.2, 609, 603.12, 29/603.15, 603.16; 310/209, 181, 214, 216; 360/98.07, 99.08, 99.04

See application file for complete search history.

(56) References Cited

U.S. PATENT DOCUMENTS

| | | | | |
|---|---|---|---|---|
| 4,102,040 A | * | 7/1978 | Rich | 29/596 |
| 4,202,196 A | | 5/1980 | Asai et al. | |
| 4,912,833 A | * | 4/1990 | Fritzsche | 29/596 |
| 6,584,672 B1 | | 7/2003 | Bourgeois | |
| 6,745,456 B2 | * | 6/2004 | Wood | 29/596 |
| 6,819,024 B1 | | 11/2004 | Fujita et al. | |
| 7,103,964 B2 | | 9/2006 | Vohlgemuth | |
| 2003/0071534 A1 | | 4/2003 | Kreuzer et al. | |
| 2004/0010907 A1 | | 1/2004 | Vohlgemuth | |

FOREIGN PATENT DOCUMENTS

CN   1296865   5/2001

(Continued)

*Primary Examiner*—Derris H Banks
*Assistant Examiner*—Tai Nguyen
(74) *Attorney, Agent, or Firm*—Michael J. Striker

(57) ABSTRACT

The manufacturing device for bending an electromagnetic element of an electrical machine, which includes a stator lamination (5), has a first device (10) for bending the stator lamination (5) to form a pre-curved stator lamination and a second device (25) for final forming of the pre-curved stator lamination. The second device (25) includes a first assembly (29) for axially fixing and pressing the pre-curved stator lamination and a second assembly for radially centering and pressing the pre-curved stator lamination. The first device (10) includes a bending mandrel (11) around which the stator lamination (5) bendable, which has an outer diameter that is larger than an inner diameter of the fully bent electromagnetic element.

30 Claims, 4 Drawing Sheets

FOREIGN PATENT DOCUMENTS

| | | |
|---|---|---|
| CN | 1438753 | 8/2003 |
| DE | 1 089 465 | 9/1960 |
| DE | 2 057 933 | 6/1972 |
| EP | 1 109 286 | 6/2001 |
| FR | 2 431 330 | 2/1980 |
| GB | 1 373 217 | 11/1974 |
| JP | 5-234301 | 9/1993 |
| JP | 8-80014 | 3/1996 |
| JP | 2001-298885 | 10/2001 |
| WO | 80/00288 | 2/1980 |
| WO | 01/54254 | 7/2001 |

* cited by examiner

MANUFACTURING DEVICE FOR BENDING AN ELECTROMANETIC ELEMENT OF AN ELECTRICAL MACHINE

BACKGROUND OF THE INVENTION

The present invention relates to a manufacturing device and a method for manufacturing an electromagnetic element for an electrical machine, which comprises a curved stator lamination.

For stators of electrical machines designed to be used as high-performance generators for motor vehicles, it has already been provided by WO 01/54254 A1 to join strip-shaped laminations and thereby produce an essentially parallelepipedal stator lamination, to curve the stator lamination into a hollow cylindrical shape, and to bond the two ends with each other, e.g., via welding. The better that the ends can be connected in a form-fit manner, the better the overall results are. A further aim is to attain the greatest possible roundness of the thusly-formed stator in its stator bore. The better the roundness is, the smaller the air gap of the machine can be designed to be, the better the material utilization and power output are, and the quieter the electrical machine is.

To improve the roundness, it was provided in EP 1 109 286 A2 to curve both ends of the parallelepipedal stator lamination at the start of manufacture such that the stator lamination takes on a predetermined curvature in this region. Only then is the entire stator lamination curved into the hollow cylindrical shape by placing the stator lamination around a cylindrical bending mandrel and applying pressure on it using a bending roller that acts on the external side of the stator lamination. In the flat state, the two ends are still freely accessible and can be shaped very easily such that, after the stator lamination is curved into a round shape, the pre-curved ends face each other and only need to be joined. Good roundness of the stator can therefore be attained. If, however, a core winding with at least one winding overhang is wound and joined in the stator lamination, and at least one slot is provided on one of its ends for accommodating the winding overhang, this end cannot be curved in advance, since doing so would close the slots in this region, thereby making it impossible to insert the winding overhang in the predetermined slot.

In addition, a large number of requirements on the manufacture of an electromagnetic element must be fulfilled. For example, when unfavorable winding types and coil shapes are used, the laminations expand in an irregular manner at the end faces and in the middle of the stator lamination, which results in an uneven gap width between the ends of the stator lamination to be joined. In fact, the gap width is that much more uneven the thinner the laminations are and the bulkier the winding overhangs are.

When the flexural behavior of individual laminations is not uniform, this also results in problems in joining the overhang coil. In some cases, stator laminations with overhang coils must be bent in stages, in order to make it possible to join the overhang coil; this procedure results in considerable out-of-roundness.

SUMMARY

A manufacturing device for bending an electromagnetic element of an electrical machine is provided, wherein the electromagnetic element comprises a curved stator lamination.

A first device for bending the stator lamination and a second device for the final forming of the pre-curved stator lamination are provided. The second device includes a first assembly for axially fixing and pressing the stator lamination and a second assembly for radially centering and pressing the stator lamination. The two assemblies perform these functions simultaneously—briefly, at least—thereby enabling the curved stator lamination to be centered and pressed axially and radially simultaneously, at least briefly.

In a favorable embodiment, the first device includes a bending mandrel, around which the stator lamination is bendable; the outer diameter of the bending mandrel is larger than an inner diameter of the fully-bent electromagnet element. The step of curving the two ends of the parallelepipedal stator lamination before it is actually bent into a round shape—which makes it difficult to access the slots to insert coils—can be eliminated. When the bending mandrel includes radially-extending raised areas, e.g., nubs, on at least some portions of its circumference, they can serve as stops for a tooth of the stator lamination or the tooth crest of the tooth. Slots, which are provided to accommodate windings of magnet wires, are located between teeth of the stator lamination. At least one flank of the raised areas that points in the direction of bending serves as a stop. The raised areas serve to fix the teeth in position in the circumferential direction. A radial orientation and good axial alignment of the teeth can therefore be ensured. Uniform flexural behavior of the lamination is also made possible, and the laminations are prevented from attaining different lengths when bending is carried out. It can be ensured that a joining position for a winding overhang is attained.

In a favorable refinement, the bending mandrel includes at least one slot that extends in the axial direction. During assembly, this axially-extending slot can accommodate the winding overhang, at the least, or the winding overhang with associated slot seal. It is therefore possible to bend a parallelepipedal stator lamination that has a winding with a winding overhang in its slots. The winding can be premanufactured entirely and without interruption, in series production. Subsequent expense for connecting the windings with a conductor is eliminated.

In a favorable refinement, the first device includes a pressure unit. The pressure unit preferably has a diameter of more than 25 mm, and preferably more than 30 mm. Bending forces and, therefore, an elongation of the stator lamination are reduced. As a result, the inner diameter and joining position for the winding overhang can be attained in a defined manner.

The pressure unit preferably has a nearly endlessly large diameter, thereby ensuring that the pressure unit includes a straight section for the bending procedure. Bending forces and the undesired elongation of the stator lamination can therefore be reduced that much more. The inner diameter and joining position for the winding overhang are attained reliably and under optimized conditions.

In a favorable refinement, the pressure unit has a serrated or wavy contour on its side facing the stator lamination. This is advantageous with a stator lamination or a resultant electromagnetic element that has a serrated or wavy outer contour. The contour of the pressure unit dips at least partially into the outer contour of the stator lamination and bears against the lateral flanks of the outer contour. Uniform flexural behavior of the lamination is supported, and the laminations are prevented from attaining different lengths when bending is carried out. It can be ensured that the joining position for the winding overhang is attained. Extending across the axial length of the stator lamination, an even gap width results between the ends of the stator lamination, which face each other after the bending process is carried out.

In a favorable refinement, the pressure unit is driven by its being pulled along by a pressure roller. Contact surfaces between the pressure unit and the pressure roller are smooth. A soft bending process occurs in particular with stator laminations that have a serrated outer contour, since a rolling motion of the pressure roller is decoupled from the serrated outer contour of the stator lamination.

In a favorable refinement, the pressure unit includes additional devices for axially orienting winding overhangs and/or for axially preloading the stator lamination. By orienting axially, an axial overhang of the winding heads past the end faces of the stator lamination can be adjusted on an A side and a B side, in accordance with a predetermined winding head height. Due to the axial preloading of the stator lamination, laminations with relatively thin disks, e.g., 0.65 mm wide at most, can be curved without their becoming wavy. It is ensured that the winding will be oriented axially relative to the stator lamination, since an interference fit of the winding in the flat stator lamination, i.e., with the slots still open, is inadequate at first. The stator lamination is preloaded axially across its entire lamination length, i.e., laminations are clamped together in the stacking direction. This ensures that, when thin lamination disks are used, the laminations will not become wavy or impermissibly deformed out of the plane of the disk when bending is carried out.

Favorably, a parallelepipedal stator lamination can be curved into a round shape in the first device without preprocessing, e.g., without curving the ends of the stator lamination, on just one device and under defined conditions.

In the first device, the following method steps are preferably carried out to bend a parallelepipedal stator lamination to form a curved stator lamination. The parallelepipedal stator lamination is first oriented exactly with its first full tooth on the bending mandrel between two circumferential raised areas, e.g., nubs, and it is clamped tightly in place. Using a first plunger positioned on the first half-tooth of the stator lamination, a force that counteracts the bending force—a "retaining force"—is applied, and the stator lamination is supported by the pressure roller to prevent it from slipping. The winding overhang is secured before the bending procedure is started. The pressure roller is moved into a pre-track angular position. The stator lamination is bent, in sections at a time, into various angular positions. In the different angular positions, the portion of the initially parallelepipedal stator lamination that has already been bent is clamped tightly on the bending mandrel using at least one clamping jaw. The winding overhang is inserted into the slot of the bending mandrel. The winding overhang is inserted into the slot of the stator lamination. The two ends of the stator lamination are clamped tightly on the bending mandrel using the clamping jaws of a device that is guided toward the stator lamination radially from the outside. This device and its plunger are guided between the ends of the stator lamination until they reach the bending mandrel. As this occurs, pressure is applied to the lateral flanks of the two half-teeth on the ends, thereby spreading them apart such that they deform in the tangential direction and close the slots adjacent to them, i.e., the first and last slots on the circumference of the stator lamination. The pre-curved stator lamination is transferred to the second device for final shaping; this second device can also include a device for integral joining. The entire process of bending a stator lamination is accomplished in this method step; the height of the yoke is the same at the ends as it is in the rest of the stator lamination, i.e., the stator lamination has a constant yoke height across the entire bending range.

In a favorable refinement, a part of the second device of the manufacturing device is provided as a tool to transfer the pre-curved stator lamination between the first and second devices. It is favorable when the second device includes a clamping device for the fully-bent stator lamination for the integral joining of abutting free ends of the stator lamination. The integral joining is preferably carried out using laser welding.

In a favorable refinement, the second device includes a welding mandrel with a diameter that is the same as the inner diameter of the fully-bent stator lamination. It is also favorable when the cylindrical welding mandrel includes radially-extending raised areas on its circumference that match up with slot openings in the fully-bent stator lamination. The raised areas are advantageously designed as nubs. It is advantageous when the second device includes a device with segments for radially pressing the stator lamination that was pre-curved in the first device onto the welding mandrel. With this, the stator lamination can be fixed in position reliably on the welding mandrel.

The segments are preferably divided into at least two groups. As an option, the groups of segments can be drivable in different manners or independently of each other, e.g., in a load-displacement-controlled manner.

Advantageously, each group of segments extends across an angular range of less than 180°, based on the outer diameter of the fully-bent stator lamination. The angular range of the first segment group is preferably located on the diametrical side opposite to the ends of the stator lamination that form the abutting edges and it is symmetrical to an axis that extends in the center between the ends of the stator lamination. The angular range of the second and every subsequent segment group adjoins the angular range of the first or previous segment group and extends in the direction toward the ends of the stator lamination. The angular range is axisymmetrical on both sides of the axis that extends in the center between the ends of the stator lamination.

In a favorable refinement, the segments are designed as two pieces and/or wedge-shaped, e.g., in the form of a system of compressed wedge and driving wedge. The individual pairs of wedges share a sliding surface, which makes it possible for the two wedges to move relative to each other. The inner contour of the compressed wedges that points toward the stator preferably matches the outer diameter of the stator lamination, while the outer contour shares a contact surface with the driving wedges, the contact surface being curved in the axial and radial directions and serving as a sliding surface. The compressed wedges are movable essentially only in the radial direction. The driving wedges are located such that they are displaced outwardly in the axial and radial directions relative to the compressed wedges, and they are capable of being moved essentially only in the axial direction. They are driven by another part of the device. The axial motion of the driving wedges is converted into a radial motion of the compressed wedges. The segments are preferably composed of at least five pairs of wedges.

In a favorable refinement, the second device includes an assembly for axially centering and pressing the pre-curved stator lamination; an axial force can be introduced at both end faces, on the inner diameter and the outer diameter of the fully-bent stator lamination.

In the second device, the following method steps are preferably carried out to complete the bending of the pre-curved stator lamination to produce the desired electromagnetic element of an electrical machine. The pre-curved stator lamination, with the ends of its abutting edges still exposed, is placed in the second device and is oriented appropriately. Segments of the first group are moved into place until the stator lamination bears against the welding mandrel in the region of the first segment group. The segments of the second group and every subsequent group are moved into place simultaneously and, if necessary, with a suitable delay after the first or preceding group until the stator lamination also bears against the welding mandrel in the region of the second segment group and every subsequent segment group. The device module for axially preloading the stator lamination is moved into place. Segments of all groups are moved into place simultaneously, evenly, and equidistantly. The ends of the stator lamination are joined with each other.

It is advantageous that a parallelepipedal stator lamination can be bent, and that the height of the yoke at the ends is the same as it is in the rest of the stator lamination, i.e., that a stator lamination can be created that has a constant yoke height across the entire bending range. It is therefore possible to realize a gapless abutment of the two stator lamination ends after the final shaping, thereby also ensuring that the diameter is true to dimensions and ensuring good roundness of the bore of the electromagnetic element, particularly a stator. Impermissible deformations, such as waves forming in the laminations that result when laminations with thin disks (less than approx. 0.65 mm) are curved, can be prevented.

The present invention is also based on a device for bending an electromagnetic element of an electrical machine, with which the electromagnetic element is composed of a stator lamination, with a bending mandrel, around which the stator lamination is bendable, and a pressure unit, with which the stator lamination can be pressed against the bending mandrel, at least locally.

It is provided that the diameter of the bending mandrel is greater than an inner diameter of the electromagnetic element.

The diameter of the pressure unit is preferably at least 25 mm. An impermissibly high amount of force acting on the stator lamination during bending is prevented.

Particularly preferably, the pressure unit has a straight section for the bending procedure. Forces that occur during bending are distributed evenly, and the stator lamination is deformed in a homogeneous manner.

This is improved even further when a pressure roller is provided for pressing on the pressure unit.

The present invention is also directed to a device for the final forming of an electromagnetic element of an electrical machine, with which the electromagnetic element is composed of a stator lamination.

It is provided that at least a first assembly is provided for axially centering and pressing the stator lamination, and a second assembly is provided for radially centering and pressing the stator lamination.

In a favorable refinement, a transfer tool is provided to transfer the curved stator lamination from a first device to at least the first and/or second assembly. The pre-curved stator lamination can be transported in a "harmless" manner from the first device to the second device during manufacture.

A clamping device is advantageously provided for clamping the curved stator lamination so that integral joining can be carried out.

Favorably, the clamping device includes a welding mandrel and circumferential segments for radially pressing the pre-curved stator lamination onto the welding mandrel.

When the segments are divided into at least two groups, each of which extends across an angular range of less than 180° based on an outer diameter of the fully-bent stator lamination, an even distribution of force can be attained.

The present invention is further directed to a method for manufacturing an electromagnetic element, with which it is provided that a winding with an overhang coil is inserted into an essentially parallelpipedal stator lamination, the stator lamination is bent—in a first device—in a round shape such that the stator lamination forms a gap with its ends, an overhang coil of the overhang winding from one end of the stator lamination is inserted into a slot in the other end of the stator lamination, and the pre-curved stator lamination is transferred to a second device for final shaping. The shaping of the stator lamination can be completed in the second device, and the ends can be joined with each other. The gap between the ends of the stator lamination is preferably closed using laser welding.

DRAWING

Further embodiments, aspects and advantages of the present invention also result independently of their wording in the claims, without limitation to generality, from exemplary embodiments of the present invention presented below with reference to the drawing.

Figure 4A:
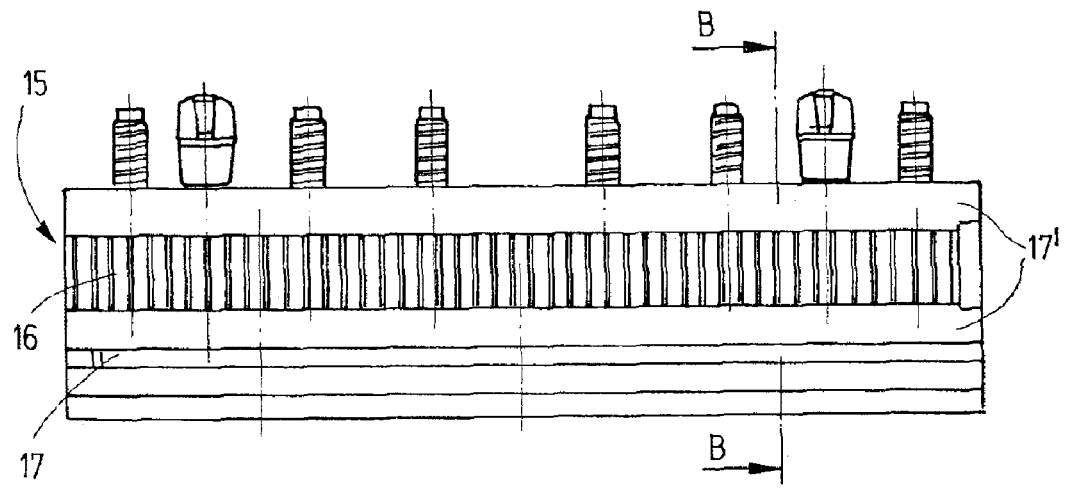
Figure 4B:
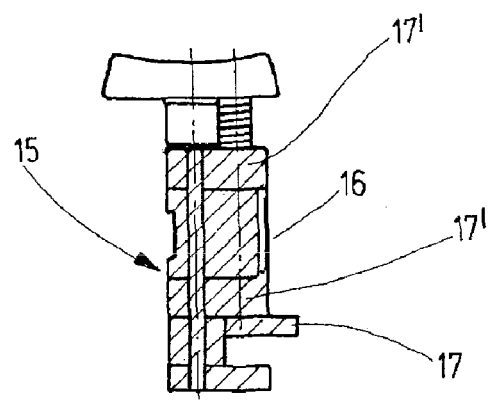
Figure 5A:
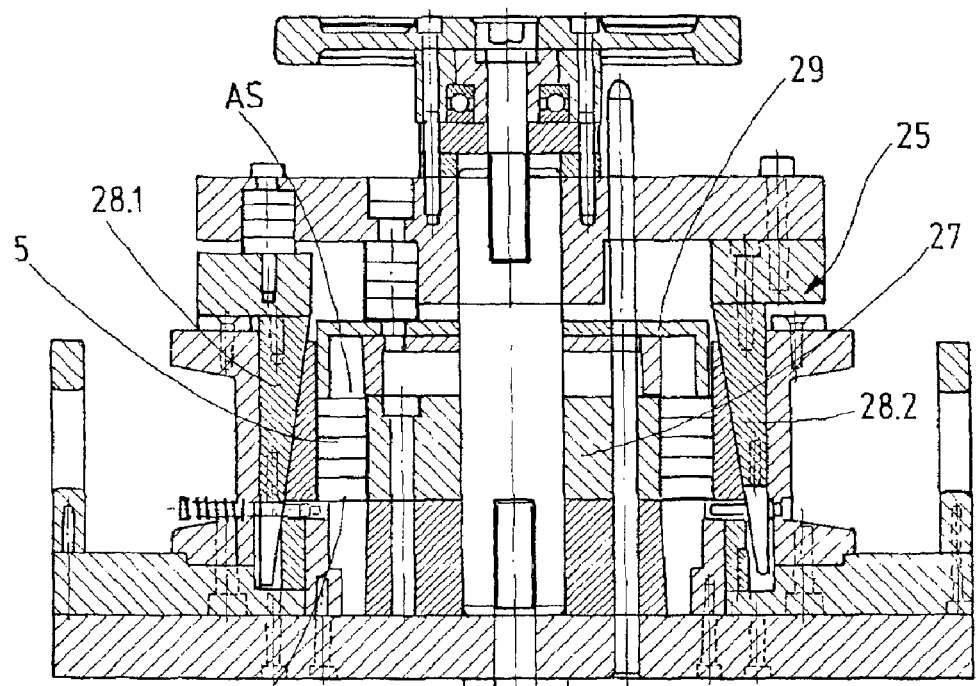
Figure 5B:
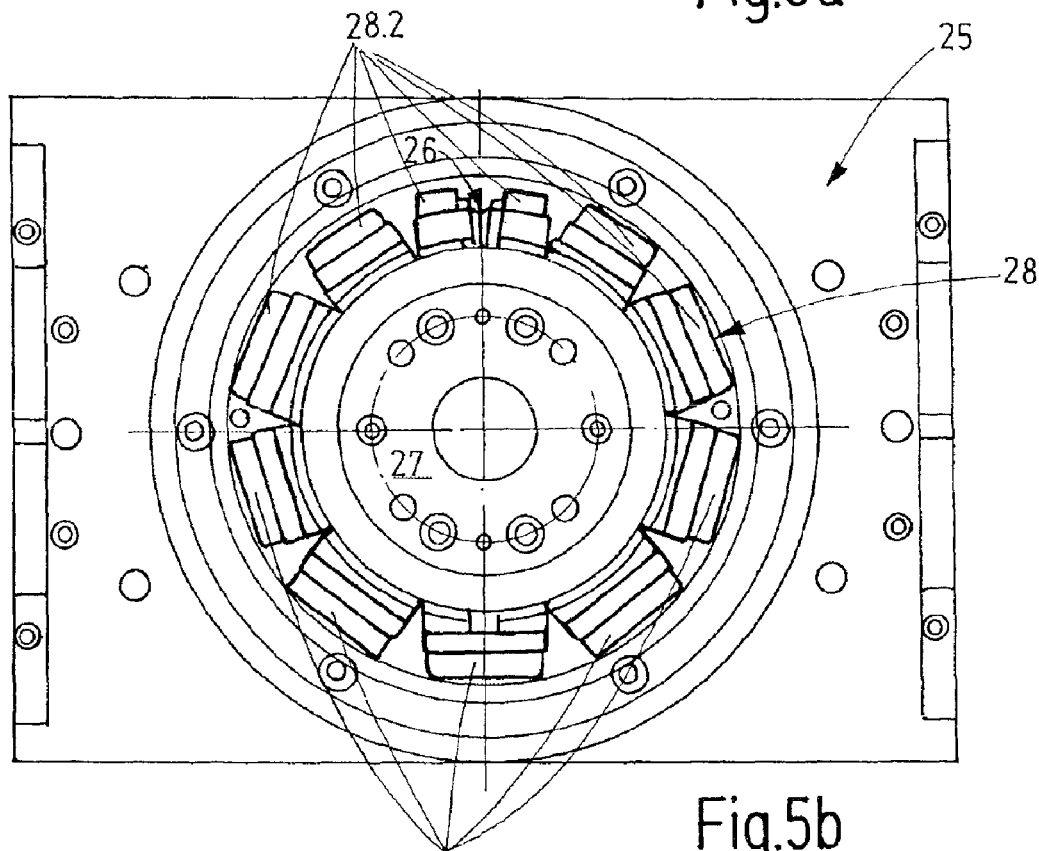

FIGS. 4 a, b show several views of a pressure unit, i.e., of the surface (a) facing a stator lamination, and of the side along the line B-B (b); and FIGS. 5 a, b show a longitudinal sectional view (a) through a part of a second device, and a top view (b) of the device.

DETAILED DESCRIPTION OF THE EXEMPLARY EMBODIMENT

The exemplary embodiment relates to an electromagnetic element—which is not shown and is designed as a stator—of an electrical machine with 48 slots and a number of poles 2p=16, with a number of slots q per pole, a phase of q=1, and a number of phases m=3. This description also applies in the same sense for electromagnetic elements with other designs, with the dimensions adapted accordingly.

Figure 1:
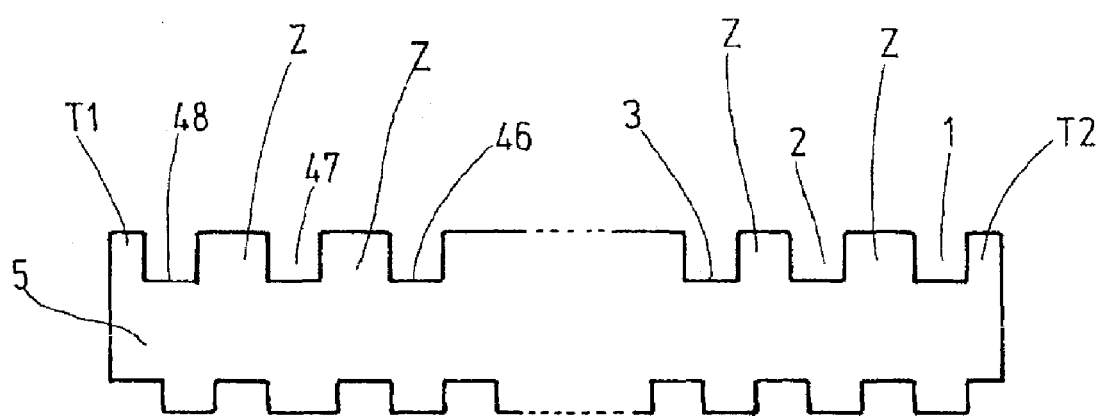
FIG. 1 is a schematic illustration of a stator lamination with inner teeth and outer teeth.

To manufacture an electromagnetic element, particularly a stator, a parallelepipedal stator lamination 5 is first formed in a manner that is common per se, as depicted schematically in FIG. 1. Strip-shaped laminations are manufactured out of a strip of, e.g., cold-rolled sheet metal, using the transverse and/or longitudinally stamping method. The quality of the strip of sheet metal is that used for electrical applications, and it is between 0.35 and 1 mm—and preferably 0.5 mm—thick. The laminations have inner teeth T1, T2, Z and outer teeth that are not described in further detail. Teeth T1, T2, Z are separated by slots. The teeth on the ends of the laminations are half-teeth T1, T2. Half-teeth T1, T2 are designed only as inner teeth, not as outer teeth. On the ends of the laminations, the end faces are not right-angled with the longitudinal axis of the laminations or neutral fibers. Instead, they deviate from a flat cut surface. The yoke height of the laminations is constant across the entire longitudinal axis of the laminations, i.e., also in the region of the ends of the laminations, e.g., the first slot division. The laminations are stacked on top of one another in a suitable manner, with or without a jacket.

The laminations are preloaded in the stacking direction with a defined amount of force, and they are joined with each other at a suitable, predetermined point, e.g., via welding.

As the next step, a winding is manufactured and installed. During subsequent use in an electrical machine, current will be supplied to the winding to produce an electromagnetic field. A multi-phase, e.g., three-phased, winding is wound onto a winding template. The winding includes at least one overhang coil (single lap winding), but it is also possible to include several, e.g., three, overhang coils (double layer lap winding).

Every phase winding is composed of several coils, which corresponds to the number of pole pairs, e.g., 8 coils. When the coils are connected in series, the phase winding is wound, without interruption, as a coil chain. The winding is then pressed, with its slot region, onto the slot mold of the round electromagnetic element—designed as a stator—to be manufactured, and its round wire cross sections are formed into any other possible shape. The winding is then inserted in the slots—which have been lined with a surface insulating material, for example—of the parallelepipedal stator lamination. The slot seals are installed, except for those that close the slot that accommodate the winding overhang (slot 2 with a single-layer lap winding), and except for those that close the slots that accommodate the winding overhang (slot 3, slot 2, slot 1 with a double-layer lap winding).

Figure 2:
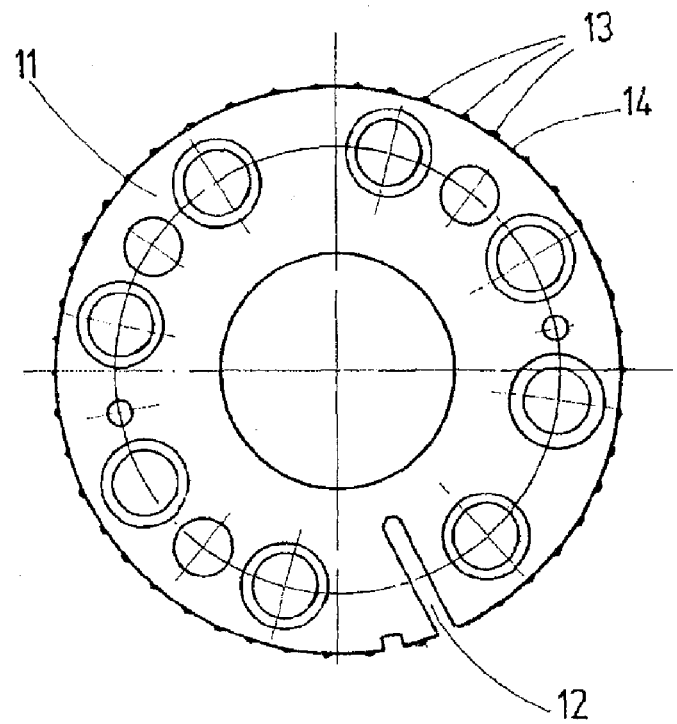
FIG. 2 shows sectional view through a bending mandrel.
Figure 3:
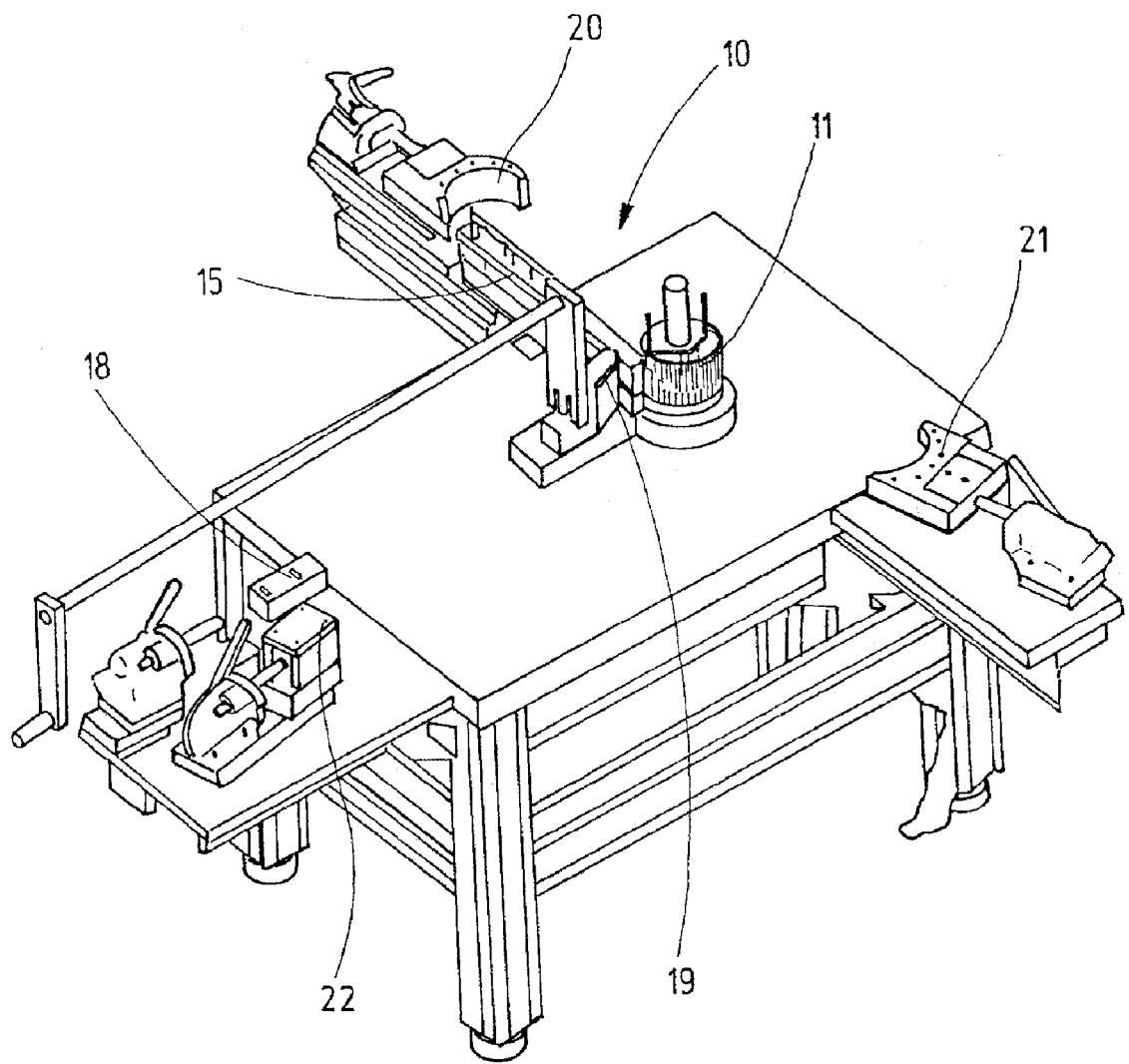
FIG. 3 shows a top view of a three-dimensional first device of an inventive manufacturing device.

Next, parallelepipedal stator lamination 5—with the winding installed—is placed on a first device 10—shown in FIG. 3—of an inventive manufacturing device, to be bent. When stator lamination 5—which is not shown—is curved around a cylindrical bending mandrel 11 to form a round electromagnetic element, this step includes the joining of the winding overhang. Bending mandrel 11 has a diameter that is greater than that of fully-bent stator lamination 5, and it includes at least one axially extending slot 12 for accommodating a winding overhang. The bending mandrel also includes radially-extending raised areas 13 on its circumference that are designed as nubs and are separated by slots 14, as shown in FIG. 2. Only a few of the elements are labeled with reference numerals in the figure.

The bending procedure starts at one end of stator lamination 5, with slot 48 (FIG. 1). When a single-layer lap winding is involved, which includes only one overhang coil as the winding overhang, one coil face of the overhang coil hangs over stator lamination 5 at one phase winding end, while the other coil face of the overhang coil fills slot 47 completely. The overhanging coil face of the overhang coil is joined at the appropriate point in time in slot 2 at the other end of stator lamination 5.

When a double-layer lap winding is involved, which includes three overhang coils as the winding overhang, one coil face of the particular overhang coil hangs over stator lamination 5 lengthwise at each phase winding end, while the other coil faces of the overhang coils fill slots 48, 47, and 46 completely. The overhanging coil faces of the overhang coils are joined in slots 3, 2 and 1 at the appropriate point in time. The bending procedure ends with slot 1 of stator lamination 5.

The description below is provided as an example and, for simplicity, it focuses on the single-layer lap winding. It is transferrable to the double-layer lap winding in the manner described above, however.

To start the bending procedure, stator lamination 5 is positioned in a pressure unit 15 designed as a pressure bar. The winding is oriented axially relative to stator lamination 5, and stator lamination 5 is axially preloaded. Pressure unit 15 is shown in greater detail in FIGS. 4a, 4b. The length of pressure unit 15 matches the circumference of stator lamination 5. In addition, the diameter of pressure unit 15 is nearly endlessly large, and it is designed straight in the bending region. A serrated or wavy contour is provided on side 16 of pressure unit 15 facing stator lamination 5, and it corresponds to the outer teeth of stator lamination 5 described above.

Pressure unit 15 is mounted on bending device 10 and it is oriented axially and tangentially relative to bending mandrel 11. Parallelepipedal stator lamination 5 is then positioned with its first whole tooth Z on the first end, i.e., the stator lamination end at which bending starts, with slot 48, on bending mandrel 11 between two of the radially-extending raised areas 13 designed as nubs in a manner such that the middle of the tooth lies exactly on a radial of bending mandrel 11. In this position, stator lamination 5 is retained securely on bending mandrel 11.

A first plunger 18 is then guided toward stator lamination 5 radially from the outside and is used to apply force to half-tooth T1 on the first stator lamination end. This force, which is referred to below as the retaining force, serves to fix stator lamination 5 in place while it is being bent. The retaining force, which counteracts the bending force, must be greater than the bending force itself, but it cannot be so great that it could press first half-tooth T1 onto bending mandrel 11 or permanently deform it such that stator lamination 5 would already take on its final round shape in this region, with the predetermined diameter. Even when the full retaining force is applied and, therefore, maximum plastic and elastic deformation takes place, a gap still exists between tooth crest Z1 of first half-tooth T1 and bending mandrel 11. The retaining force is also insufficient to completely close the first slot of the first stator lamination end, i.e., slot 48; it can only close it partially, i.e., by approximately ⅔ (approx. 5°) of the nominal angle of a slot division; this is computed by dividing the full circle by the number of slots, i.e., 360°/48=7.5°.

Initially, when first plunger 18 is pressed against stator lamination 5 and, therefore, the retaining force is applied to stator lamination 5, slot 47, i.e., the second slot from the first stator lamination end, is still open. One coil face of the overhang coil is located in slot 47, in fact, and it fills it completely. Before bending is carried out, and, therefore, before slot 47 is closed, the two coil faces, i.e., the entire overhang coil, must be retained in a suitable manner. This can be carried out only with the coil face that is the winding overhang, which hangs over stator lamination 5 in the flat state and is therefore the only part of the coil that is freely accessible and easily gripped. To this end, a further, not-shown device is guided around the sides of the coil, on both sides of the coil face; it encloses the coil face in the manner of a cage and retains it securely.

Pressure unit 15, which is designed as a pressure bar, is driven by a pressure roller 19, which is guided around bending mandrel 11 along a circular trajectory. The working position of pressure roller 19 for bending is characterized by the fact that the point at which pressure roller 19 bears against pressure unit 15 is located ahead of the tooth—in the bending direction—that already bears against bending mandrel 11. The longer strip is that is ahead of pressure roller 19, the lesser the bending force and, therefore, the greater the region is on the second stator lamination end that cannot be bent with this setting, because, at the bending end, pressure roller 19 moves past pressure unit 15—which is designed as a pressure bar—and stator lamination 5.

The actual bending takes place as soon as pressure roller 19 is guided around bending mandrel 11 along the circular trajectory and is thereby drawn in the bending direction. Pressure roller 19, in turn, drives pressure unit 15 along its specified curved trajectory such that stator lamination 5 wraps around bending mandrel 11 and, thereby, is simultaneously pulled out of pressure unit 15.

One condition for the bending that is carried out is that the tensile force transferred by the bending roller or pressure unit 15 onto stator lamination 5 must always be less than the retaining force that is applied to the first stator lamination end to fix stator lamination 5 in place on bending mandrel 11, and that must withstand the tensile force. This is the only way to ensure that no force is applied to the first whole tooth in the tangential direction of the teeth and, in general, that the bending procedure takes place free of tangential forces for all teeth of stator lamination 5. As such, it is ensured that teeth Z are oriented radially in the curved electromagnetic element.

The bending of stator lamination 5 with a bending roller that has an endlessly great diameter—which is the case with a pressure unit 15 designed as a pressure bar—is carried out while an axial preload is placed on the laminations. Clamp bars 17' are provided on pressure unit 15 for this purpose. As a result, with laminations composed of thin disks are prevented from developing a wavy shape and other impermissible deformations, and the desired dimensional stability is reliably attained.

Stator lamination 5 is bent in sections, in various angular positions, and at least one clamping jaw 20, 21 is activated. Particular clamping jaw 20, 21, which, similar to first plunger 18, can be guided toward bending mandrel 11 radially from the outside, is moved toward stator lamination 5 and, with it, a force is applied to the already-curved part of stator lamination 5 such that stator lamination 5 is pressed against bending mandrel 11. As a result, a retaining function and/or clamping function is performed, and stator lamination 5 is held in all directions, so to speak, i.e., the retaining force of first plunger 18 is taken over by a first clamping jaw 20 or 21 such that first plunger 18 can be removed, etc.

Ideal clamping conditions are given when the curved region of stator lamination 5 is pressed against bending mandrel 11 evenly, thereby ensuring that stator lamination 5 is retained in this region exactly opposite to bending mandrel 11.

In a further method step, the overhang coil is joined in the recess or slot 12 for the overhang in bending mandrel 11 so that the cage-like device which had originally fixed the winding overhang in position can be removed.

The overhang coil, including the associated slot seal, located in slot 12 in bending mandrel 11 is joined into slot 2 of stator lamination 5 as soon as slot 2 of stator lamination 5 is located opposite to slot 12 in bending mandrel 11.

As soon as pressure roller 19 has rolled past the stator lamination end, the bending procedure is over, and pressure unit 15 can be removed.

Using a second plunger 22, which can also be guided toward stator lamination 5 radially from the outside, the two stator lamination ends are retained by a fixed part of plunger 22 on bending mandrel 11, and a movable part of plunger 22 moves forward between the two ends of stator lamination 5 until it reaches bending mandrel 11, presses against the flanks of the two half-teeth T1, T2 and spreads them apart such that they are deformed in the tangential direction and thereby close slots 48 and 1. As the process continues, the transfer takes place for the final bending of stator lamination 5—which has been curved but is still open—to a second device 25 of the inventive manufacturing device, which can also serve simultaneously as a welding device.

Stator lamination 5—which is curved but still open—is placed in device 25, and is oriented in the correct position, to be finally shaped and for the two stator lamination ends to be connected. This means that stator lamination 5 is placed in device 25 with its still-present gap between the two ends of the stator lamination in a manner such that the gap points toward a welding window 26.

Second device 25 includes a stop surface for an end face of stator lamination 5 to be joined first, by way of which stator lamination 5 is oriented in the axial direction.

The radial orientation takes place in a first step via a welding mandrel 27, the diameter of which is the same as the inner diameter of the completed electromagnetic element. Radial plungers are placed against pre-curved stator lamination 5 in a stepwise manner. Stator lamination 5 now bears against welding mandrel 27.

Radial plungers are segments 28 that extend, in sections, around the outer circumference of the stator lamination and press the stator lamination against welding mandrel 27. Segments 28 are combined into at least two groups 28.1, 28.2, which are driven in different manners, e.g., in a load-displacement-controlled manner.

Segments 28 of first group 28.1, which extend around the circumference over a predetermined angular range of less than 180° and are located on the other side of the diameter relative to the stator lamination ends, which are still separated, are initially moved forward until stator lamination 5 bears against welding mandrel 27 in the region of segments 28 of first group 28.1.

Segments 28 of second group 28.2 and every further group that also extends around the circumference along an angular range that is less than 180° and abuts the first or preceding segment group 28.1, 28.2 are moved forward until stator lamination 5 also bears against welding mandrel 27 in the region of second group 28.2.

A further part of second device 25, which axially preloads stator lamination 5, is also moved forward in a load-displacement-controlled manner. The axial force that results is introduced along the inner and outer diameter on both end faces AS and BS of stator lamination 5 and prevents impermissible deformations from occurring as the process continues.

This is characterized by the fact that all segments 28 of all groups 28.1, 28.2 are moved forward simulteneously, evenly and equidistantly such that stator lamination 5 is pressed against welding mandrel 27 via its circumference with equal radial intensity; it is deformed elastically, and plastically in accordance with the desired dimensional stability until its final diameter is reached.

With this, the shaping of stator lamination 5 is complete, and the two stator lamination ends abut each other with no gaps and can be joined with each other.

After shaping is complete, no further processing is required, because the diameter and the roundness of the bore of the electromagnetic element—which preferably forms a stator—has already been created via the plastic deformation, in a dimensionally stable manner. In addition, impermissible deformations do not result, e.g., waves in laminations composed of thin disks. The roundness can be greater than 0.15, and particularly greater than 0.1 mm, particularly in the region in which the two stator lamination ends abut each other.

What is claimed is:

1. A manufacturing device for bending an electromagnetic element of an electrical machine, wherein the electromagnetic element comprises a stator lamination (5), said manufacturing device comprising a first device (10) for bending the stator lamination (5) to form a pre-curved stator lamination and a second device (25) for final forming of the pre-curved stator lamination; wherein the second device (25) includes a first assembly (29) for axially fixing and pressing the stator lamination to form a pre-curved stator lamination and a second assembly (28) for radially centering and pressing the pre-curved stator lamination;

wherein the first device (10) includes a bending mandrel (11) around which the stator lamination (5) is bendable and an outer diameter of the bending mandrel (11) is larger than an inner diameter of the fully-bent electromagnetic element.

2. The manufacturing device as recited in claim 1, wherein the bending mandrel (11) includes radially-extending raised areas (13) located on at least some portions of its circumference.

3. The manufacturing device as recited in claim 1, wherein the bending mandrel (11) includes at least one axially-extending slot (12).

4. The manufacturing device as recited in claim 1, wherein the first device (10) includes a pressure unit (15).

5. The manufacturing device as recited in claim 4, wherein, the pressure unit (15) is designed as a bending roller.

6. The manufacturing device as recited in claim 5, wherein, the pressure unit (15) has a diameter of more than 25 mm.

7. The manufacturing device as recited in claim 4, wherein, the pressure unit (15) has a diameter that is nearly endlessly large.

8. The manufacturing device as recited in claim 7, wherein, the pressure unit (15) is designed as a pressure bar.

9. The manufacturing device as recited in claim 8, wherein, the pressure unit (15) is driven by its being pulled along by a pressure roller (19).

10. The manufacturing device as recited in claim 4, wherein, the pressure unit (15) includes a serrated or wavy contour on its side (16) facing the stator lamination (5).

11. The manufacturing device as recited in claim 4, wherein, the pressure unit (15) includes additional devices (17, 17') for axially orienting winding overhangs and/or for axially preloading the stator lamination (5).

12. The manufacturing device as recited in claim 1, wherein one part of the second device (25) is provided as a tool for transferring the pre-curved stator lamination (5) between the first and second device (10, 25).

13. The manufacturing device as recited in claim 1, wherein, the second device (25) includes a clamping device (28, 29) for the pre-curved stator lamination (5) to integrally join abutting free ends of the stator lamination (5).

14. The manufacturing device as recited in claim 1, wherein the second device (25) includes a welding mandrel (27), the diameter of which is the same as the inner diameter of the fully-bent stator lamination (5).

15. The manufacturing device as recited in claim 14, wherein the welding mandrel (27) includes radially-extending raised areas on its circumference that match up with slot openings (1, 48) in the fully-bent stator lamination (5).

16. The manufacturing device as recited in claim 14, wherein the second device (25) includes an assembly with segments (28) for radially pressing the pre-curved stator lamination (5) onto the welding mandrel (27).

17. The manufacturing device as recited in claim 16, wherein, the segments (28) are divided into at least two groups (28.1, 28.2).

18. The manufacturing device as recited in claim 16, wherein every group (28.1, 28.2) of segments (28) extends across an angular range of less than 180° based on the outer diameter of the fully-bent stator lamination (5).

19. The manufacturing device as recited in claim 14, wherein, the segments (28) are composed of two wedges that slide on top of one another.

20. The manufacturing device as recited in claim 1, wherein the second device (25) includes an assembly (29) for axially centering and pressing the fully-bent stator lamination (5); an axial force can be introduced into both end faces (AS, BS), on the inner diameter and the outer diameter of the fully-bent stator lamination (5).

21. The device as recited in claim 1, wherein the second device (25) includes a transfer tool for transferring the pre-curved stator lamination (5) from the first device (10) into at least the first and/or second assembly (28,29).

22. The device as recited in claim 1, wherein the second device (25) includes a clamping device for clamping the pre-curved stator lamination (5) so that integral joining can be carried out.

23. The device as recited in claim 22, wherein the clamping device includes a welding mandrel (27) and circumferential segments (28) for pressing the pre-curved stator lamination (5) radially onto the welding mandrel (27).

24. The device as recited in claim 23, wherein the segments (28) are divided into at least two groups (28.1, 28.2) that extend across an angular range of less than 180°, based on an outer diameter of the fully-bent stator lamination (5).

25. A device for bending an electromagnetic element of an electrical machine, wherein the electromagnetic element comprises a stator lamination (5), said device comprising a cylindrical bending mandrel (11) around which the stator lamination (5) is bendable and a pressure unit (15), with which the stator lamination (5) can be pressed—at least locally—against the cylindrical bending mandrel (11), wherein a diameter of the cylindrical bending mandrel (11) is greater than an inner diameter of the fully-bent electromagnetic element.

26. The device as recited in claim 25, wherein, the pressure unit (15) is designed as a bending roller.

27. The device as recited in claim 26, wherein, the pressure unit (15) has a diameter of at least 25 mm.

28. The device as recited in claim 26, wherein, the pressure unit (15) includes a straight section for the bending procedure.

29. The device as recited in claim 28, wherein, the pressure unit (15) is designed as a pressure bar.

30. The device as recited in claim 25, wherein, a pressure roller (19) is provided for pressing the pressure unit (15).

* * * * *